Figure 3:
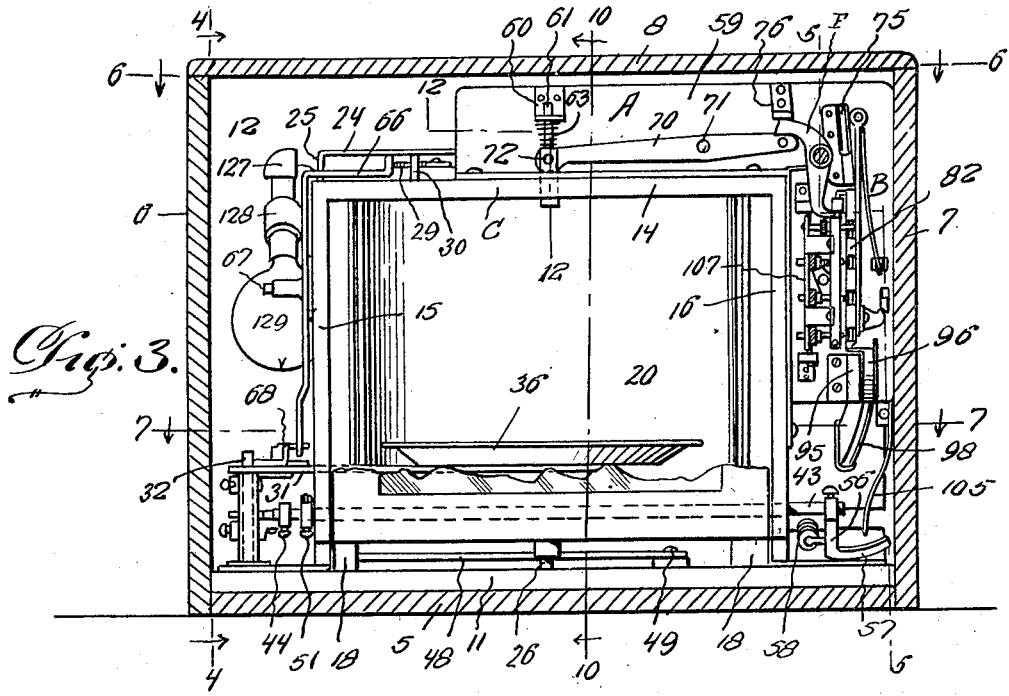

Dec. 17, 1929. G. GIAMBRA 1,739,900
AUTOMATIC SERVING DEVICE FOR RESTAURANTS
Filed Jan. 16, 1926 7 Sheets-Sheet 1
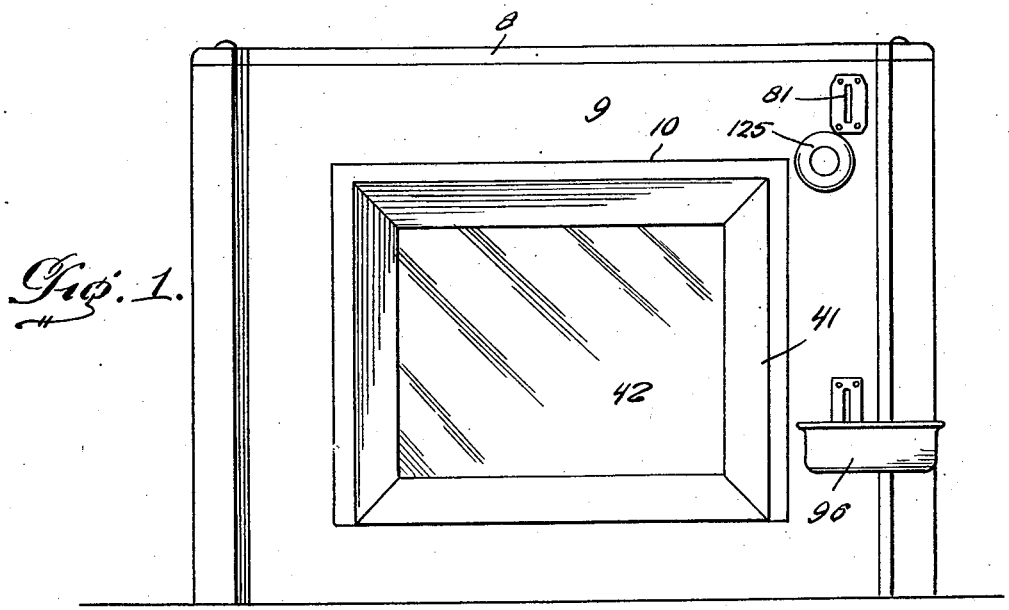
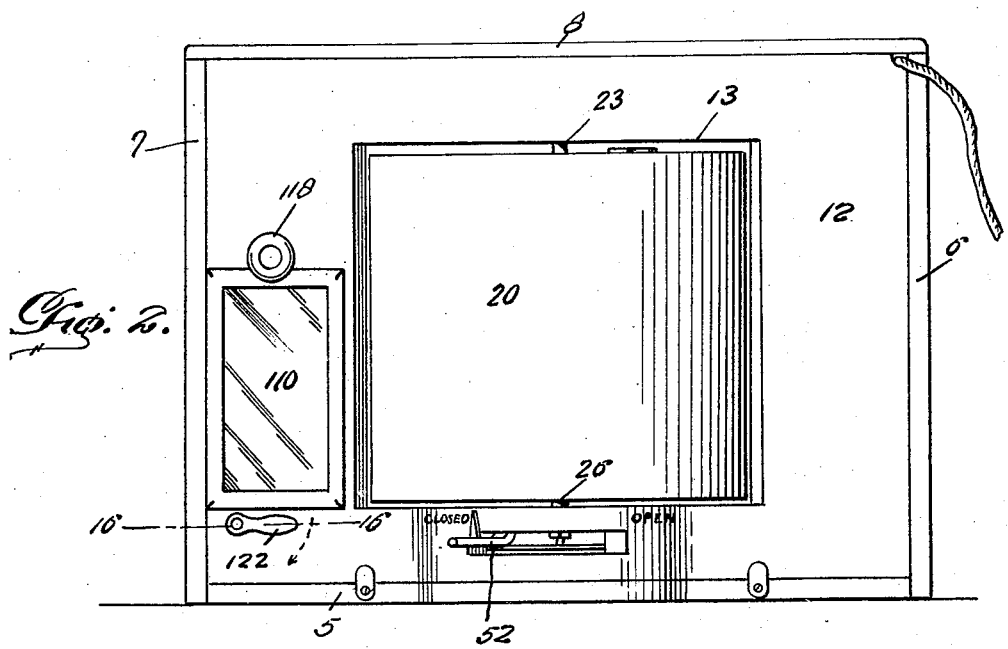

Dec. 17, 1929.  G. GIAMBRA  1,739,900
AUTOMATIC SERVING DEVICE FOR RESTAURANTS
Filed Jan. 16, 1926   7 Sheets-Sheet 2

Inventor
G. Giambra,
By Clarence A. O'Brien
Attorney

Dec. 17, 1929.  G. GIAMBRA  1,739,900
AUTOMATIC SERVING DEVICE FOR RESTAURANTS
Filed Jan. 16, 1926  7 Sheets-Sheet 3

Inventor
G. Giambra.
By Clarence A. O'Brien
Attorney

Dec. 17, 1929. G. GIAMBRA 1,739,900
AUTOMATIC SERVING DEVICE FOR RESTAURANTS
Filed Jan. 16, 1926 7 Sheets-Sheet 4

Inventor
G. Giambra,
By *Clarence A. O'Brien*
Attorney

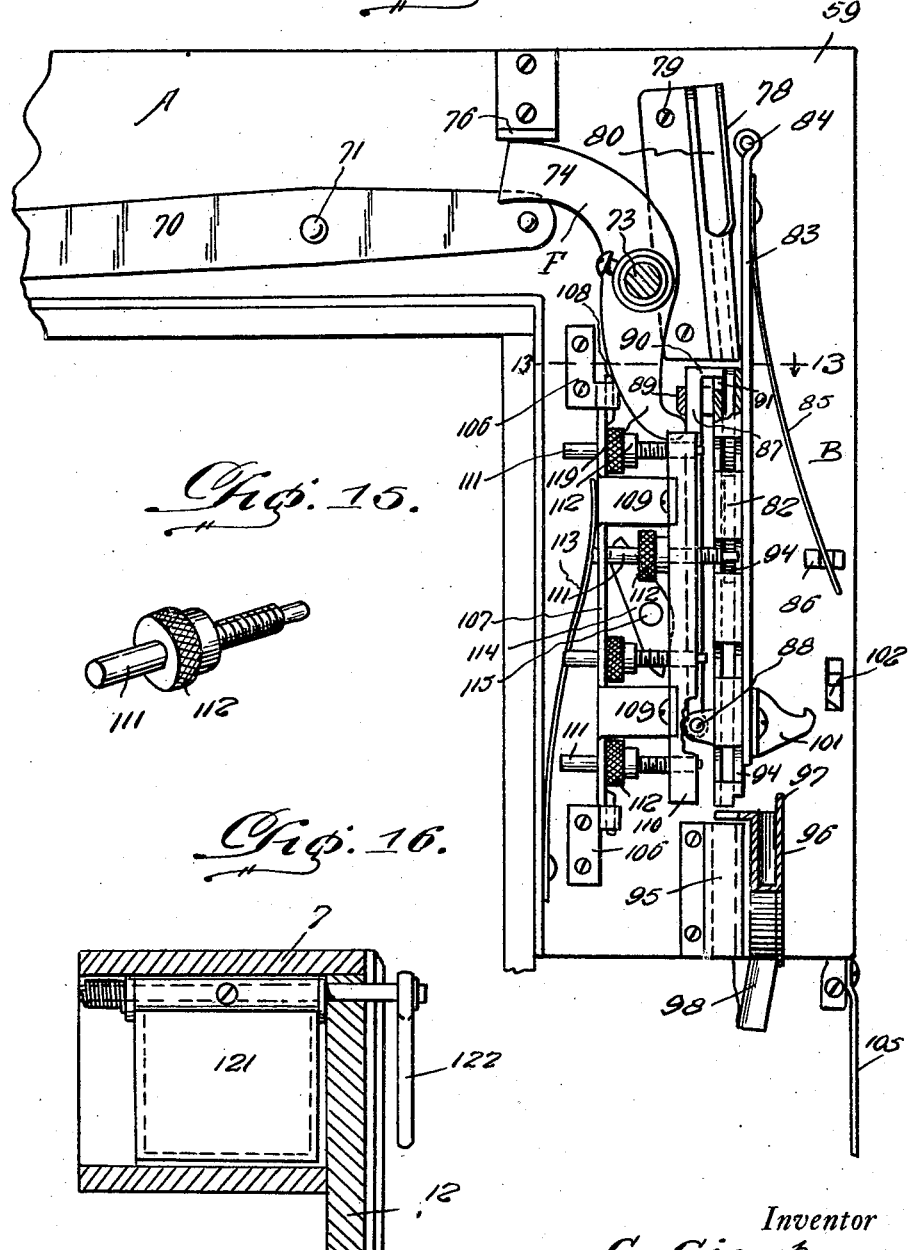

Dec. 17, 1929.  G. GIAMBRA  1,739,900
AUTOMATIC SERVING DEVICE FOR RESTAURANTS
Filed Jan. 16, 1926  7 Sheets-Sheet 6
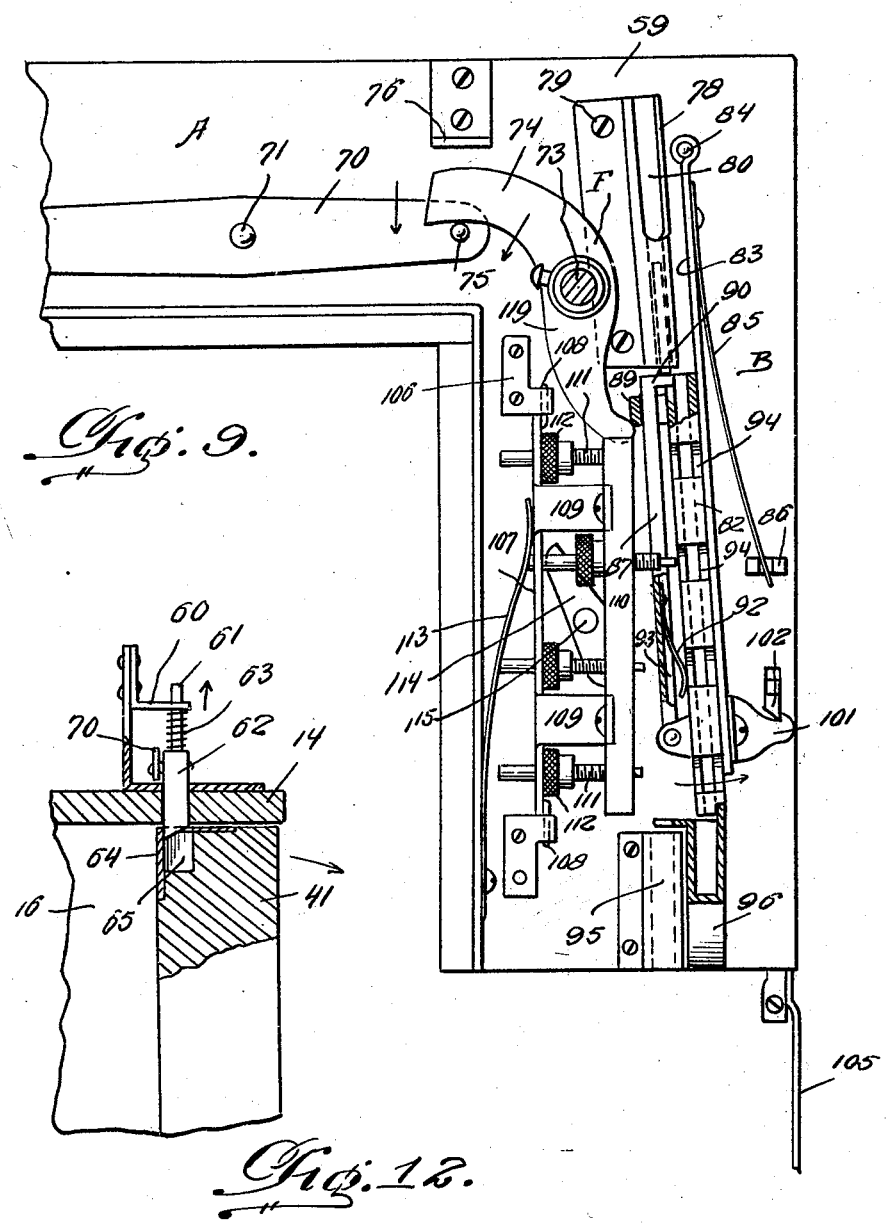
Inventor
G. Giambra,
By Clarence A. O'Brien
Attorney Dec. 17, 1929.　　　　G. GIAMBRA　　　　1,739,900
AUTOMATIC SERVING DEVICE FOR RESTAURANTS
Filed Jan. 16, 1926　　7 Sheets-Sheet 7
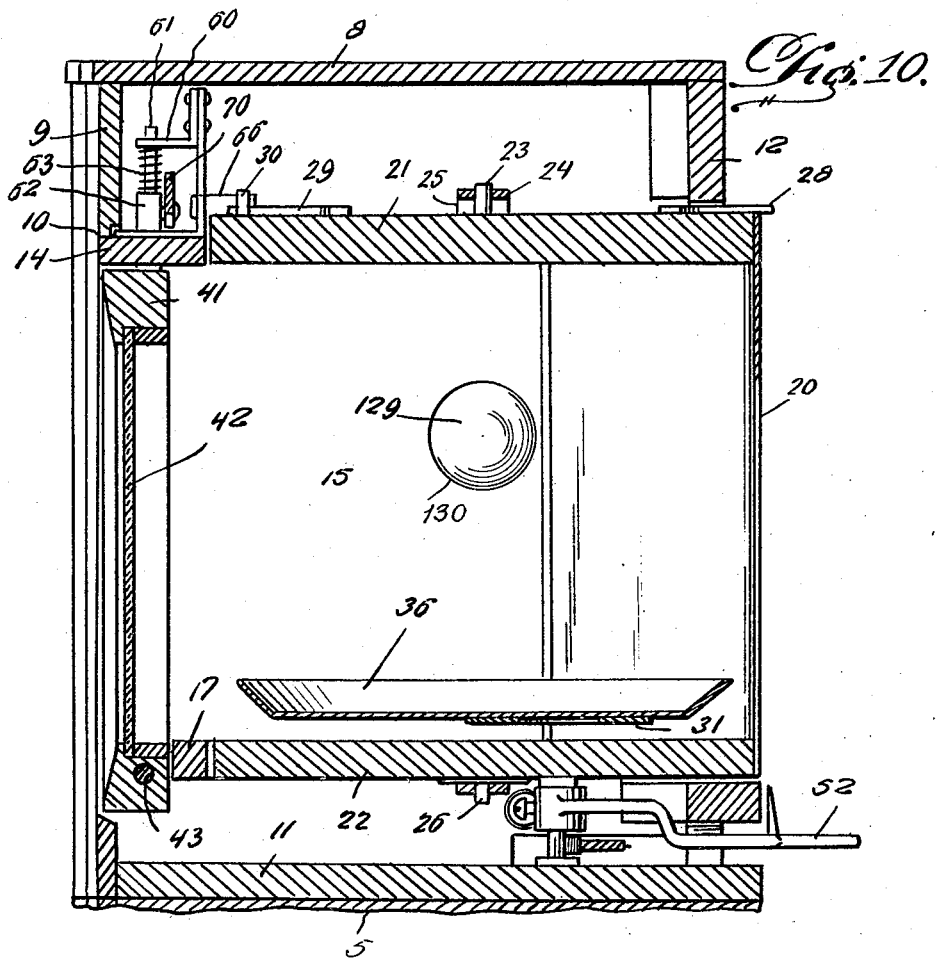
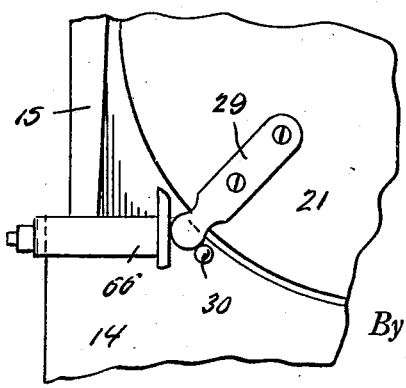
Inventor
G. Giambra,
By Clarence A. O'Brien
Attorney Patented Dec. 17, 1929

1,739,900

UNITED STATES PATENT OFFICE

GANDOLFO GIAMBRA, OF PATERSON, NEW JERSEY

AUTOMATIC SERVING DEVICE FOR RESTAURANTS

Application filed January 16, 1926. Serial No. 81,860.

The present invention relates to an automatic self-serving and coin-controlled device for restaurants.

An object of the invention is to provide a mechanism for housing a predetermined amount of food which may be seen through a transparent panel through a door and the provision in conjunction therewith of a coin control mechanism, whereby a coin may be used for actuating the mechanism to open the door and present the food to a customer.

Another important object of the invention is to provide a device of this nature having a casing closed by a transparent door and the provision of a food holder having an ejector mechanism associated therewith. When the door is opened, said holder is ejected from the casing so that the customer may take the food therefrom.

Another important object of the invention is to provide a device of this nature including a casing having a revolving screen therein, whereby access may be had to the interior of the casing and whereby the view to the kitchen is shut off from the front of the device.

Another important object of the invention is to provide a casing having a transparent door at its forward end, and a revolvable screen interiorly thereof, and means for preventing the revolving of the screen while the door is open.

Another important object of the invention is to provide means for indicating whether the door is open or closed from the rear of the device and reclosing said door when it is open.

Another important object of the invention is to provide an improved coin control mechanism for releasing the door of said casing.

Another important object of the invention is to provide a coin controlled mechanism whereby the same may be adjusted to allow actuation upon the insertion of one or a plurality of coins.

Another important object of the invention is to provide a coin controlled mechanism wherein the coin or coins may be returned to the purchaser by an attendant, if the purchaser decides he does not want the food before having manually actuated the mechanism.

Another important object of the invention is to provide a device of this nature which is constructed so that the parts thereof are conveniently assembled in a compact and accessible manner.

Another important object of the invention is to provide a device of this nature which is exceedingly simple in its construction, easy to manipulate, not likely to readily become out of order, thoroughly reliable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 4:
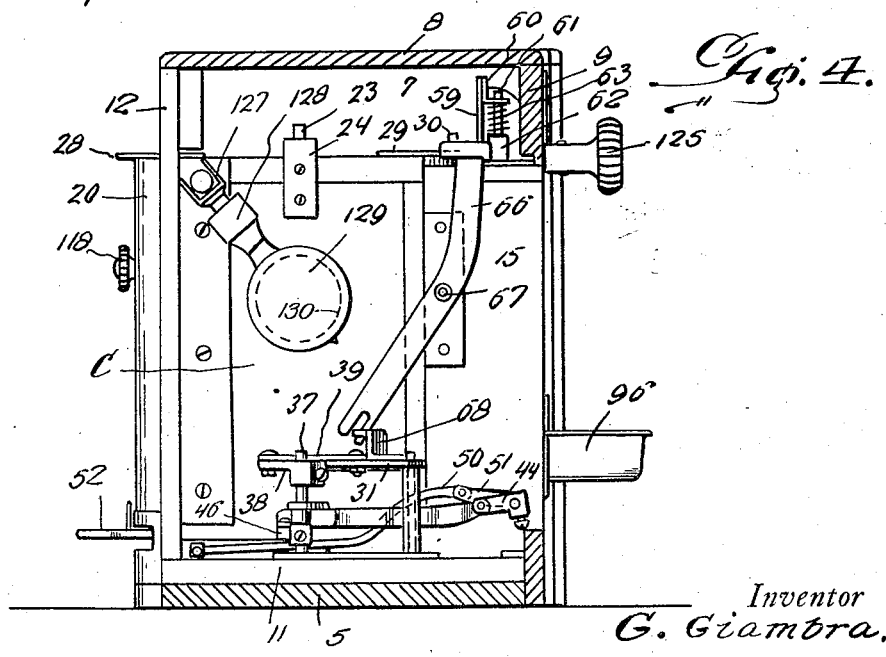
Figure 5:
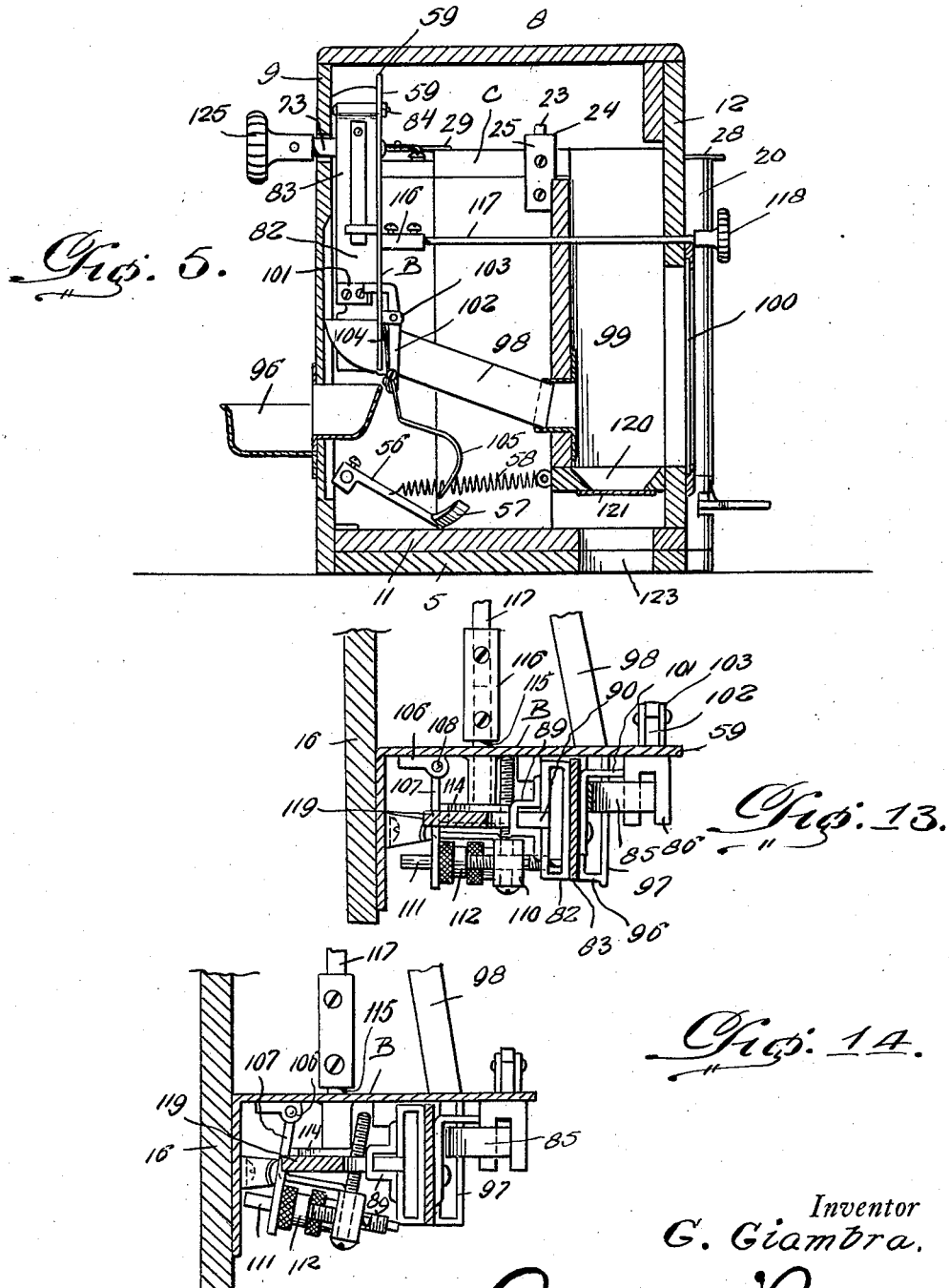
Figure 6:
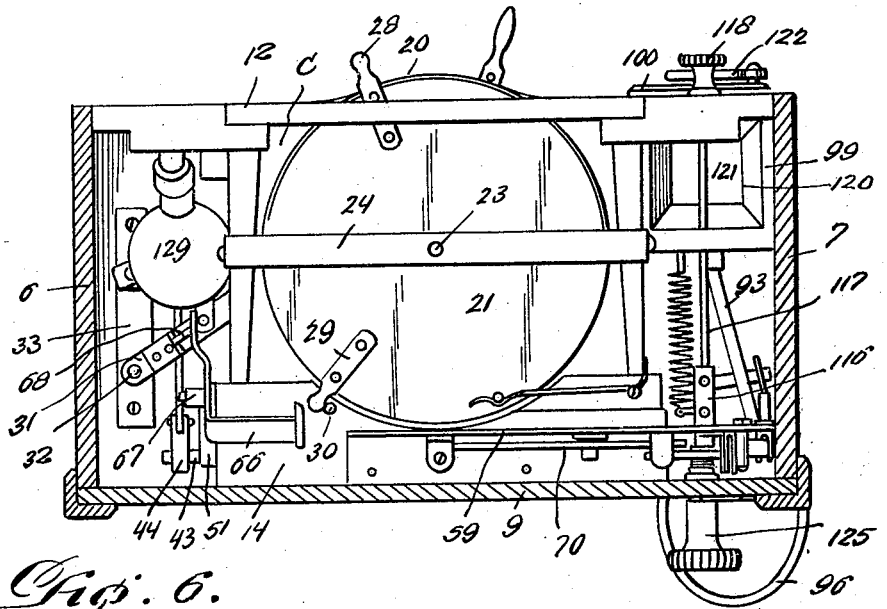
Figure 7:
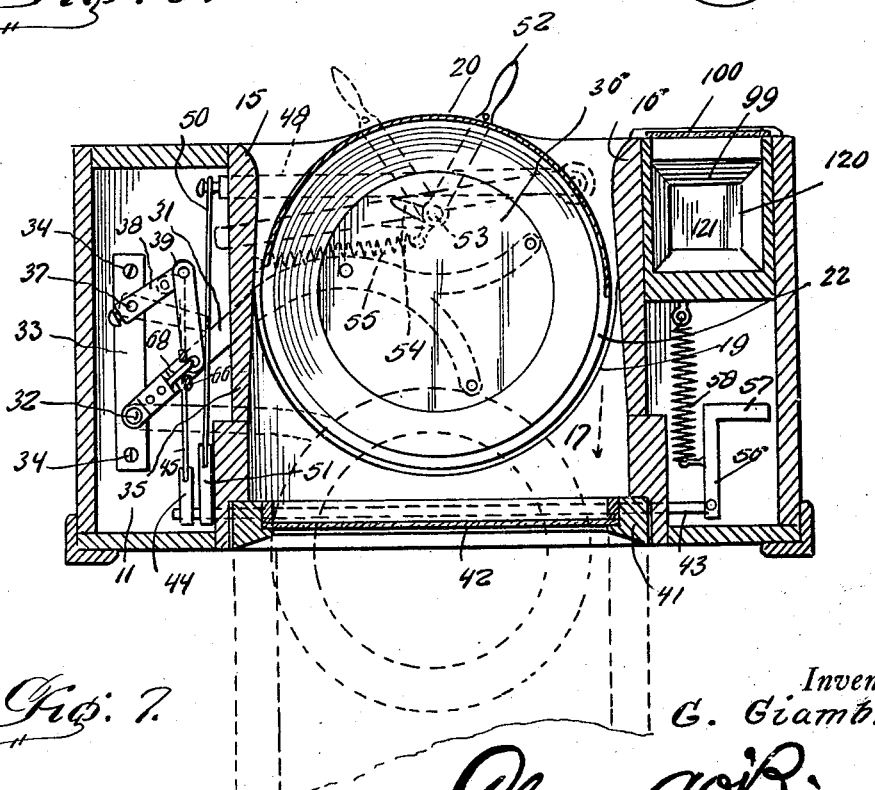

Figure 1 is a front elevation of the device embodying the features of my invention, Fig. 2 is a rear elevation thereof, Fig. 3 is a front elevation of the device showing the interior of the cabinet with the front wall of the cabinet not shown, Fig. 4 is a vertical transverse section taken approximately on the line 4—4 of Fig. 3, looking in the direction of the arrow, Fig. 5 is another vertical transverse section taken approximately on the line 5—5 of Fig. 3, showing the coin controlled mechanism in elevation, Fig. 6 is a horizontal section, looking downwardly, taken approximately on the line 6—6 of Fig. 3, Fig. 7 is another horizontal section looking downwardly, taken substantially on the line 7—7 of Fig. 3, Fig. 8 is a front elevation, on an enlarged scale, of the coin control mechanism, Fig. 9 is a similar view showing some of the parts in a different position, Fig. 10 is a vertical section taken approximately on the line 10—10 of Fig. 3, Fig. 11 is an enlarged detail plan view showing the stop mechanism for the revolving screen, Fig. 12 is an enlarged detail section taken substantially on the line 12—12 of Fig. 3, Fig. 13 is an enlarged detail section taken substantially on the line 13—13 of Fig. 8, looking downwardly, Fig. 14 is a similar view showing parts in a different position, Fig. 15 is a perspective view of one of the stops used in the coin controlled mechanism, Fig. 16 is an enlarged detail section taken substantially on the line 16—16 of Fig. 2.

Referring to the drawings in detail, it will be seen that the cabinet includes a bottom 5, a pair of sides 6 and 7, a top 8, and a front wall 9. The front wall 9 is provided with an opening 10 preferably rectangular in formation. A base 11 is slidable over the upper surface of the bottom side and has a rear wall 12 rising from its rear edge which is adapted to close the rear end of the cavity. This rear wall 12 has a rectangular opening 13 registering with the opening 10 in the front wall 9. A casing indicated generally by the letter C is mounted on the base 11, and includes a top 14 and sides 15 and 16. The casing C also includes a bottom 17 which is spaced by cleats 18 from the upper surface of the base 11.

The top 14 and the bottom 17 are provided with openings 19. A curved screen 20 has a circular top plate 21 and a circular bottom plate 22 (see Figs. 6 and 7). A trunnion 23 rises from the top plate 21 centrally and is journaled in a bracket bar 24 extending across the top of the casing having depending ends 25 (Fig. 3), which are fixed to the sides of the casing in any suitable manner. Another trunnion 26 depends from the center and bottom plate 22 and is journaled in the base plate 11 in any suitable manner, whereby the screen 20 is adapted to revolve in the casing closing either the front or rear end thereof.

Suitable handles 28 and 29 are provided on the top plate 21 to project beyond the periphery thereof for the purpose of revolving the screen 20 when desired. A stop 30 is provided on the top wall 14 of the casing and the handle 29 is adapted to normally be in abutment therewith as is clearly shown in Fig. 6.

An arm 31 is pivoted at one end on a pin 32 rising from a plate 33 fixed at 34 on the base 11. This arm 31 extends through a slot 35 in the side wall 15 and the inner end thereof has mounted thereon a plate 36 for supporting food. The plate 36 is normally disposed concentrically between the top and bottom plates 21 and 22, of the screen 20. A vertical shaft 37 is journaled in the plate 33 to rise therefrom. A crank 38 is fixed to this shaft 37 and is engaged with a link 39 which is pivotally engaged with the arm 31 so that by rotating the shaft 37 to swing the crank 38 to the dotted line position shown in Fig. 7, the arm 31 will be swung to the dotted line position shown in the same figure to project the plate 36 through the front end of the casing C. A door 41 is mounted to close the front end of the casing C. This door is provided with a suitable transparent panel 42. A shaft 43 is journaled through the sides 15 and 16 and the lower end of the door 41 is fixed thereto, so that by the rotation of this shaft the door 41 may be swung to an open position, and cause the swinging of a crank 44 on the shaft 43 which has a link 45 attached thereto and to a crank 46 on the shaft 37, thereby swinging said shaft 37 as heretofore indicated.

Thus it will be seen that when the door 41 swings to an open position, the plate 36 will be simultaneously ejected from the casing and when the door is swung to a closed position, said plate 36 will be moved back into the casing. A bar 48 is pivoted at one end as at 49 on the base 11. Referring now particularly to Fig. 7, one end is engaged with a link 50.

The link 50 is attached to a crank 51 and the shaft 43. A lever 52 is suitably pivoted at one end on the base 11 as at 53 and has a cam extension 54 engageable with the bar 48. A spring 55 is associated with the lever 52 for maintaining the cam 54 in engagement with said bar 48.

It will thus be seen that when the door 41 is moved to an open position, the bar 48 is swung forwardly, thereby moving the lever 52 from the full line position shown in Fig. 7 to the dotted line position shown in the same figure. Therefore by moving the lever 52 from said dotted line position to said full line position, the cam 54 will engage the bar 48 to swing it rearwardly, thereby pulling on the link 50, rocking the crank 51 and the shaft 43 to cause the closing of the door 41. A crank 56 is mounted on the end of the shaft 43 adjacent the side 16 of the casing C and has an extension 57, the purpose of which will be brought out hereinafter.

A spring 58 is associated with the crank 56 and is under tension when the door is in a closed position, and is again under tension when the door is in an open position. The purpose of the spring 58 will appear later as the description proceeds.

An L-shaped bracket plate 59 is mounted on the casing C and includes the upper horizontal portion A and the lower vertical portion B. A bracket 60 is fixed to the portion A and the shank 61 of a bolt 62 is slidable therethrough, being pressed downwardly by a spring 63. The bolt 62 extends through an opening provided in the top 14 of the casing C and is engageable (see Fig. 12) with a keeper 64 on the upper edge of the door adjacent notch 65. When the bolt 62 is lifted in a manner which will be brought out later, the spring 58 which is under tension will partially swing the crank 56 to rotate the shaft 43 to swing the door 41 partially open and then the door will gravitate to a full open position and as it reaches said full open position, the spring 58 will again be tensioned to function as a buffer. The lower edge of the bolt 62 is beveled, so that as the door 41 is swung to a closed position, it will be raised and the spring 63 will then be tensioned to force the bolt into the notch 65 to engage the keeper 64 to hold the door 41 against being opened in an unauthorized manner.

A lever 66 is pivoted as at 67 in the side 15 of the casing and the lower end of the same is engaged by a lug 68 carried on arm 31. As will be seen in Fig. 3, the upper end of this lever is bent over the top 14 of the casing and terminates adjacent the stop 30. When the arm 31 is swung to the dotted line position in Fig. 7, the lug 68 swings the lever 66 so that the upper terminal thereof moves rearwardly in the path of the handle 29 and thus it is impossible to revolve the screen 20 when the door is open and the plate 36 is in its ejected position.

It is, therefore, necessary to swing the lever 52 to close the door and return the plate 36. The screen 20 may then be revolved so that a new dish of food may be placed on the plate 36. It will be seen that the screen 20 prevents customers from seeing back into the kitchen.

A lever 70 is pivoted at 71 on the portion A of the bracket 59 and has one end suitably engaged at 72 with the bolt 62 so that when the other end is depressed, said bolt 62 is lifted to a releasing position. A shaft 73 is journaled in the bracket 59, at the upper end of the portion B and has fixed thereon the cam element F including the portion 74 engageable over a pin 75 projecting from the adjacent end of the lever 70. A stop bracket 76 is located above the end of the portion 74 to limit the movement thereof. It will be seen that when the shaft 73 is rotated, (see Figs. 3, 8 and 9) in a counter-clockwise direction, the portion 74 of the cam F will swing downwardly to depress the pin 75 and rock the lever 70 in a clockwise direction, thereby lifting to a releasing position the bolt 62.

A fixed coin chute 78 is mounted on the upper portion of the part B of the bracket plate 59, by means of screws 79 or in any other suitable manner. This fixed chute is preferably disposed on an incline and has an entrance 80 which communicates with a coin insert slots 81 in the upper right hand corner of the front wall 9 of the cabinet. A coin chute 82 has an extension 83 disposed alongside of the fixed chute 78 and pivoted on the bracket plate 59 at its upper edge as at 84. A coiled leaf spring 85 is fixed to the extension 83 of the coin chute 82 and extends through the slot of a lug 86 projecting from the portion B of the bracket plate 59 for normally holding said chute 82 with its upper end in register with the lower end of the fixed chute 78. A bar 87 is pivoted at its lower end, as at 88 to the lower portion of the chute 82. The upper end of the bar 87 is limited in its swinging movement by a loop 89 provided on the upper end of the chute 82 and through which the upper end of the bar 87 extends.

The upper end of the bar 87 merges into a rectangularly disposed extension 90 extending through an opening 91 in the upper end of the chute 82. As I have shown to advantage in Fig. 9, a small leaf spring 92 is attached at one end in a channel 93 provided in the bar 87 and holds said bar in abutment with the outer portion of the loop 89. When the bar 87 is swung, as will be explained later, inwardly toward the chute 82 it causes the extension 90 to be disposed across the interior of said chute 82, unless the proper coin or coins are disposed therein.

The extension 90 also functions as a ledge for a coin which might have been inserted in the chute 78 when the chute 82 is out of alinement therewith, and will also prevent surplus coins from clogging up the mechanism, while it is being operated as will appear later. The chute 82 is provided with a plurality of openings along its forward edge as indicated at 94, said openings being spaced from one another, the approximate distance being equal to the diameter of the coins to be used. Normally the chute 82 extends vertically downwardly from the bottom end of the chute 78 and when so disposed the lower edge of said chute 82 registers with a return chute 95 which leads to a receptacle 96' extending through the front wall of the casing.

A chute 96 is located alongside the chute 95 and has a projection 97 acting as a stop for the lower end of the chute 82 when said lower end is swung in registry therewith as is shown in Fig. 9. This chute 96 communicates with a chute 98 which leads to a compartment 99 having a transparent panel 100 so that the money falling therein may be seen by an attendant in the rear of the device. A catch 101 projects laterally from adjacent the lower end of the chute 82 and is engageable by an L-shaped dog 102 pivoted to a bracket 103 projecting rearwardly from the portion B of bracket plate 59 and is spring actuated by leaf spring 104.

It will thus be seen that when coin chute 82 is swung to the position shown in Fig. 9, that is so that its lower end is in register with the chute 96, said catch 101 will be engaged by the spring pressed dog 102. A cam member 105 depends from the dog 102 and is engageable by the extension 57 of crank 56 as the door swings to an open position for releasing said dog from engagement with the catch so that the spring 85 may return the chute 82 to its normal position shown in Fig. 8.

A pair of vertically spaced bearing brackets 106 are mounted on the front side of the portion B of the bracket plate 59 and a plate 107 has upper and lower pintles 108 journaled in said bearing brackets 106. Lateral extensions 109 are provided on the plate 107 and support a bar 110. A plurality of stop members 111 are threaded through the bar 110 and extend through plate 107. Knobs 112 are provided on the intermediate portion of these stop members 111 between the plate 107 and bar 110 so that by operation of the knobs the stop members 111 may be extended through their respective openings 94 in the chute 82.

As shown in Figs. 8 and 9, the second stop member 111 from the top is extended to project into the second opening 94 from the top so that it will be necessary to insert two coins to actuate the coin controlled mechanism. If the top member 111 is projected into its top opening 94 only one coin would be necessary. With this plurality of stop members it is possible to use a like number or less number of coins as will be apparent as the description proceeds.

The leaf spring 113 normally holds the plate 107 and the bar 110 in the position indicated in Fig. 13. However, a cam 114 which is mounted on a shaft 115, may be turned to engage the plate 107 so as to swing said plate and the bar 110 to the position shown in Fig. 14, that is so as to move the member 111 which may be projected into its respective opening 94 therefrom, so that a coin in said chute 82 may fall down into the return chute 95. A coupling 116 is engaged with the shaft 115 and also with a shaft 117 which extends through the rear wall 12 and has an operating knob 118 on the exterior end thereof for actuation by the attendant.

It will thus be seen that if a coin is dropped in the chute 82, before said chute 82 is swung to the position shown in Fig. 9, said coin or coins may be returned. The cam element F includes a segment 119 which is normally disposed to engage the upper portion of the bar 87 immediately below the loop 89. If no coin or coins are in the chute 82, it will be seen that the rocking of the shaft 73 will cause the extremity of the cam segment 119 to swing the bar 87 inwardly toward the chute 82, after which said extremity of the cam segment will engage under the loop 89, and said loop 89 will merely act as a stop as it is in alinement with the extremity of the cam 119 and the pivot 84.

If the proper coin, or number of coins are disposed in the chute 82 and the shaft 73 is rocked, the extremity of the cam 119 will swing the bar 87 so as to cause the extension 90 to abut the top coin and to thus cause the chute 82 to swing away from the bar 110. Thus when the chute 82 swings the extremity of the cam 119 will engage the outside of the loop 89 so that the chute 82 will continue to swing outwardly until the lower extremity abuts the stop 97. When in this position, the stop member 111 which was projected through its respective opening 94 in the chute 82 will be out of said opening 94 so that the coin or coins may drop down through the chute 82, through the chute 96, through the chute 98, into the compartment 99.

The rocking of the shaft 73 as just described will simultaneously cause the segment 74 to release the bolt 62 and allow the door to swing open as heretofore indicated.

As shown in Figs. 8 and 9, the mechanism is set for the reception of two coins. If, for example, three coins have been inserted, it will be seen that the third coin will remain in the chute 78 and rest on the extension 90 as the chute 82 is swung to the right of these figures. As soon as the chute returns, however, said surplus coin will fall down into the chute 82 and may be returned by the attendant upon operation of the knob 118 as previously indicated.

By looking through the transparent panel 100, the attendant may ascertain immediately whether or not the proper amount of money has been used in the operation of the mechanism. In the bottom of the compartment 99, there is provided an opening 120 normally closed by a spring pressed lid 121 particularly illustrated in Fig. 16. This lid is operated by a crank 122 exteriorly and rearwardly disposed in relation to the cabinet. Any suitable receptacle may be placed under the openings 123 which register with the opening 120 and register with each other so that when it has been ascertained that the correct amount of money has been used in actuating the device, the crank 122 may be operated and the lid 121 opened so that the money may fall through the openings 123 provided in the bottom 5 and base 11.

It is thought that the details of my invention have now been sufficiently described to understand the general operation of the device. The screen 20 is revolved from the back of the casing C to the front thereof thus closing off the view through the transparent panel 42 of the door 41. The attendant then places the desired food on the pan or plate 36. The screen is then returned to its rear position in the casing and the food on the pan 36 is visible through the transparent panel 42.

If a customer desires the food on said pan, he drops the necessary coin or number of coins into the entrance slot 81 from which the coin or coins pass into the chute 78 and then into the chute 82. If the proper coin or number of coins have been delivered to the chute 82, the knob 125 on the exterior end of the shaft 73 may be rotated for causing the swinging of the cam element F, thereby simultaneously opening the door through the intermediacy of lever 70, releasing the bolt 62 and swinging the chute 82 from the position shown in Fig. 8 to that shown in Fig. 9, so that the coin may drop through this chute 96, thence through the chute 98 to the compartment 99. When the chute 82 is swung to the position shown in Fig. 9, the catch 101 is engaged by the dog 102 and is held momentarily with its lower end in registry with the chute 6. However, as soon as the door opens the extension 57 and the crank 56 engages the cam 105 on the dog 102, thereby swinging said dog free of the catch whereby said spring 85 returns the chute 82 to its normal position.

Particular attention is directed to the accessibility and compactness of the convenient arrangement of the parts of this mechanism. The base 11 and the parts mounted thereon may be readily slid out of the cavity merely by the removal of the knob 125, thereby giving access to the coin control mechanism, the operating mechanism for the door, and the stop mechanism incident to the spring. It is, therefore, very easy to keep the device in repair, so that the maximum efficiency may be maintained.

The present embodiment of the invention has been disclosed in detail, since in actual practice it attains the features of advantage enumerated as desirable in the statement of the invention and the above description. It it apparent, however, that numerous changes in the details of construction, and in the combination and arrangement of parts may be resorted to without departing from the spirit and scope of the invention as hereinafter claimed or sacrificing any of its advantages.

I find it desirable to provide a bracket 127 on one side of the casing C for supporting an electric socket 128 so that an electric bulb 129 may be engaged therewith and disposed alongside of an opening 130 in the side 15 of the casing C, thus efficiently illuminating the interior of said casing so that the food may be clearly visible through the transparent panel 42 of the door 41.

Having thus described my invention, what I claim as new is:—

1. A device of the class described including, in combination, a casing, a door hinged to the casing, an arm, a pan mounted on the arm interiorly of the casing, a mechanism between the door and the arm for swinging said arm as the door is swung so that said pan will be ejected from the casing when said door is opened, and will be returned into the casing as the door is closed, means for closing said door, means engageable with said door to hold it in a closed position, a crank swingable with said door, and a spring engaged with said crank so as to be under tension when said door is in a fully closed position, and also be under tension when the door is in a fully open position.

2. A device of the class described, including, in combination, a casing, a door hinged to the casing at the front end thereof, an arm mounted for swinging movement in the casing, a pan on the inner end of said arm, means operatively connecting the arm and the door so that when said door is opened, said pan is ejected from said casing, and when said door is closed said pan is returned into the casing, a screen pivotally mounted in the casing to be disposed either rearwardly or forwardly of the pan therein, and means for preventing the revolving of said screen when said door is in an open position.

3. A device of the class described, including, in combination, a casing, a door hinged to the casing at the front end thereof, an arm mounted for swinging movement in the casing, a pan on the inner end of said arm, means operatively connecting the arm and the door so that when said door is opened, said pan is ejected from said casing, and when said door is closed said pan is returned into the casing, a screen pivotally mounted in the casing to be disposed either rearwardly or forwardly of the pan therein, means for preventing the revolving of said screen when said door is in an open position, said door being mounted to gravitate to an open position, a bolt associated with the casing and the door, for holding said door in a closed position, and means for releasing the bolt.

4. A device of the class described including, in combination, a casing, a door hinged to the casing at the front end thereof, an arm mounted for swinging movement in the casing, a pan on the inner end of said arm, means operatively connecting the arm and the door so that when said door is opened, said pan is ejected from said casing, and when said door is closed said pan is returned into the casing, a screen pivotally mounted in the casing to be disposed either rearwardly or forwardly of the pan therein, means for preventing the revolving of said screen when said door is in an open position, a bolt associated with the casing and the door, for holding said door in a closed position, means for releasing the bolt, a crank associated with the door to swing therewith, and a spring associated with the crank to be under tension when said door is closed, so that when said bolt is released, said spring will impart the initial movement to the gravitation of said door to an open position.

5. A device of the class described including, in combination, a casing, a door hinged to the casing at its bottom edge and adapted for swinging movement downwardly to an open position, a shaft fixed to said door and journaled in the casing, a crank on one end of said shaft, a link engaged with said crank, said link being engaged with a second crank, a second shaft, said second crank being fixed to said second shaft, a third crank being fixed to said second shaft, a pivotally mounted arm swingable into said casing, a link connecting the third crank with said arm, a pan on the inner end of said arm, said cranks being disposed so that when said door is swung to an open position, said arm is swung to eject the pan out of the casing, and when said door is closed said arm is swung to return the pan into the casing.

6. A device of the class described including, in combination, a casing, a door hinged at the casing at its bottom edge and adapted for swinging movement downwardly to an open position, a shaft fixed to said door and journaled in the casing, a crank on one end of said shaft, a link engaged with said crank, said link being engaged with a second crank, a second shaft, said second crank being fixed to said second shaft, a third crank being fixed to said second shaft, a pivotally mounted arm swingable into said casing, a link connecting the third crank with said arm, a pan on the inner end of said arm, said cranks being disposed so that when said door is swung to an open position, said arm is swung to eject the pan out of the casing, and when said door is closed said arm is swung to return the pan to the casing, a fourth crank on the end of said first shaft, a link engaged with said fourth crank, a bar pivotally mounted in the bottom of the casing and having its free end engaged with said link, a lever, a cam on said lever, and a spring holding said lever so that said cam normally engages said bar, whereby said lever may be swung for swinging said bar, pulling the last mentioned link, swinging the cross crank, rotating the first shaft, and returning the door to a closed position.

7. A device of the class described including in combination, a casing, a door hinged at the casing at its bottom edge and adapted for swinging movement downwardly to an open position, a shaft fixed to said door and journaled in the casing, a crank on one end of said shaft, a link engaged with said crank, said link being engaged with a second crank, a second shaft, said second crank being fixed to said second shaft, a third crank being fixed to said second shaft, a pivotally mounted arm swingable into said casing, a link connecting the third crank with said arm, a pan on the inner end of said arm, said cranks being disposed so that when said door is swung to an open position, said arm is swung to eject the pan out of the casing, and when said door is closed said arm is swung to return the pan to the casing, a fourth crank on the end of said first shaft, a link engaged with said fourth crank, a bar pivotally mounted in the bottom of the casing and having its free end engaged with said link, a lever, a cam on said lever, and a spring holding said lever so that said cam normally engages said bar, whereby said lever may be swung for swinging said bar, pulling the last mentioned link, swinging the cross crank, rotating the first shaft, and returning the door to a closed position, a fifth crank on the other end of the first shaft, a spring engaged with said fifth crank to be under tension when said door is in a fully open position and a fully closed position, a bolt for holding said door in a closed position, and coin controlled means for releasing said bolt.

8. In a dispensing apparatus, the combination of a case open at front and back, a door for the front opening pivoted on a horizontal axis at its lower edge in the case, a carrier supported in and by the case and movable therein from a position within the same to a position over the door when the latter is open, and means, connecting the door and carrier, to cause the carrier to move from the first to the second position when the door is opened and vice versa when the door is closed.

9. In a dispensing apparatus, the combination of a case open at front and back, a train of parts movable back and forth in the case and including a door for the front opening pivoted on a horizontal axis at its lower edge and a carrier movable from a housed position in the case forward over the door and back, and a manually operative resetting member in the case engaging said train and projecting toward the rear of the case.

10. In a dispensing apparatus, the combination of a case open at front and rear, a carrier movable in the case from a position within the same to a forward position, and a shield to obstruct the view through the case rotatable around the carrier from a position rearward to a position forward of the carrier, and vice versa when the carrier is in the first position, the carrier being connected with the case radially outward of the path of movement of the shield.

In testimony whereof I affix my signature.
GANDOLFO GIAMBRA.